(12) United States Patent
Sachse et al.

(10) Patent No.: US 9,163,128 B2
(45) Date of Patent: Oct. 20, 2015

(54) TITANIUM OXIDE-CONTAINING ALUMINUM OXIDE PARTICLES BASED ON CORUNDUM MELTED IN AN ELECTRIC ARC FURNACE FROM CALCINED ALUMINA, AND A METHOD FOR THE PRODUCTION THEREOF

(71) Applicant: Center for Abrasives and Refractories Research and Development - C.A.R.R.D. GmbH, Villach St. Magdalen (AT)

(72) Inventors: Sebastian Sachse, Villach (AT); Andreas Boerger, Villach (AT); Alexander Kral, Villach (AT)

(73) Assignee: Center For Abrasives and Refractories Research & Development C.A.R.R.D. GmbH, Villach (AT)

( * ) Notice: Subject to any disclaimer, the term of this patent is extended or adjusted under 35 U.S.C. 154(b) by 0 days.

(21) Appl. No.: 14/360,170

(22) PCT Filed: Nov. 23, 2012

(86) PCT No.: PCT/EP2012/073471
§ 371 (c)(1),
(2) Date: May 22, 2014

(87) PCT Pub. No.: WO2013/076249
PCT Pub. Date: May 30, 2013

(65) Prior Publication Data
US 2015/0175769 A1  Jun. 25, 2015

(30) Foreign Application Priority Data
Nov. 25, 2011 (DE) .......................... 10 2011 087 147

(51) Int. Cl.
| | | |
|---|---|---|
| C01F 7/38 | (2006.01) | |
| C09K 3/14 | (2006.01) | |
| C04B 35/111 | (2006.01) | |
| C08K 3/22 | (2006.01) | |
| C01F 7/02 | (2006.01) | |
| C04B 35/10 | (2006.01) | |
| C04B 35/622 | (2006.01) | |
| C04B 35/653 | (2006.01) | |
| B02C 23/08 | (2006.01) | |
| C08K 3/36 | (2006.01) | |

(52) U.S. Cl.
CPC . *C08K 3/22* (2013.01); *B02C 23/08* (2013.01); *C01F 7/027* (2013.01); *C01F 7/38* (2013.01); *C04B 35/10* (2013.01); *C04B 35/622* (2013.01); *C04B 35/653* (2013.01); *C08K 3/36* (2013.01); *C09K 3/1409* (2013.01); *C01P 2002/85* (2013.01); *C01P 2004/03* (2013.01); *C01P 2006/80* (2013.01); *C04B 2235/5296* (2013.01); *C04B 2235/72* (2013.01); *C08K 2003/2227* (2013.01); *C08K 2003/2241* (2013.01); *C08K 2003/2244* (2013.01); *C08K 2003/2272* (2013.01)

(58) Field of Classification Search
CPC ...... C01F 7/38; C09K 3/1409; C09K 3/1427; C04B 35/10; C04B 35/101; C04B 35/106; C04B 35/111
USPC .......................................... 106/438
See application file for complete search history.

(56) References Cited

U.S. PATENT DOCUMENTS

| | | | |
|---|---|---|---|
| 4,111,668 A | | 9/1978 | Walker et al. |
| 4,157,898 A | * | 6/1979 | Walker et al. ............... 51/309 |
| 5,531,799 A | * | 7/1996 | Wagner et al. .............. 51/309 |
| 5,603,738 A | | 2/1997 | Zeiringer et al. |
| 8,323,792 B2 | * | 12/2012 | Alary et al. ............. 428/402 |
| 8,545,582 B2 | * | 10/2013 | Gaeta ...................... 51/297 |
| 8,557,012 B2 | * | 10/2013 | Raffy ........................ 55/523 |

FOREIGN PATENT DOCUMENTS

| | | |
|---|---|---|
| CN | 1064259 A | 9/1992 |
| CN | 101268014 A | 9/2008 |
| CN | 101678534 A | 3/2010 |
| DE | 27 23 036 | 12/1977 |
| DE | 43 39 031 C1 | 1/1995 |
| WO | WO 2013/076249 A2 | 5/2013 |

OTHER PUBLICATIONS

International Search Report dated Jun. 13, 2013, for International Application No. PCT/EP2012/073471.
Office Action issued Dec. 16, 2014, in related Chinese Application No. 201280057585.X.

* cited by examiner

*Primary Examiner* — Anthony J Green
(74) *Attorney, Agent, or Firm* — Finnegan, Henderson, Farabow, Garrett & Dunner, L.L.P.

(57) ABSTRACT

Titanium oxide-containing aluminum oxide particles are based on corundum melted in an electric arc furnace from calcined alumina. The particles may have an aluminum oxide content of less than 97.0% by weight, a titanium oxide content ranging from 1.3% by weight to 1.8% by weight, and a zirconium oxide content of ranging from 0.02% by weight to 0.1% by weight. The aluminum oxide particles may have an arithmetic mean compactness of less than 0.8.

5 Claims, 1 Drawing Sheet

# TITANIUM OXIDE-CONTAINING ALUMINUM OXIDE PARTICLES BASED ON CORUNDUM MELTED IN AN ELECTRIC ARC FURNACE FROM CALCINED ALUMINA, AND A METHOD FOR THE PRODUCTION THEREOF

CLAIM FOR PRIORITY

This application is a U.S. national phase entry under 35 U.S.C. §371 from PCT International Application No. PCT/EP2012/073471, filed Nov. 23, 2012, which claims the benefit of priority of German Patent Application No. 10 2011 087 147.0, filed Nov. 25, 2011, the subject matter of which is incorporated herein by reference.

The instant invention relates to titanium oxide-containing aluminum oxide particles based on corundum melted in an electric arc furnace from calcined alumina comprising the features of the preamble of claim 1 and to a method for the production thereof.

Due to their high level of hardness and their high melting point, melted corundums are used as abrasives and fireproof materials. The production takes place by melting the raw materials in the electric arc furnace. Depending on the raw materials, which are used, a differentiation is made between the so-called bauxite corundums, which, based on bauxite as the raw material are obtained in the electric arc furnace with the help of a reducing melt, and the alumina corundums, in which alumina are used as the raw material, which are produced chemically by alkaline disintegration of bauxite.

In addition to aluminum oxide, the naturally occurring bauxites substantially contain iron oxide, titanium oxide and silicon oxide as contaminations, which are partially removed in the reducing melting in the electric arc furnace. The normal corundums, which are known in the abrasive and refractory industry, are obtained in this manner comprising a $TiO_2$ portion of approx. 3% by weight and the semi-friable corundums comprising a $TiO_2$ portion of approx. 1.6% by weight.

The titanium oxide content influences the physical characteristics of the products. The titanium oxide-containing bauxite corundums are thus characterized by a high viscosity, which can be increased even further by means of a subsequent temperature treatment.

The analysis of the titanium oxide content is an important method for controlling the quality during the melting. During the production of the bauxite corundum, the carbon reduces a portion of the $TiO_2$ to $Ti_2O_3$, which is soluble in aluminum oxide up to a certain extent.

In response to annealing in the presence of oxygen, a characteristic steel-blue color forms, which is the result of the formation of $Ti^{3+}/Ti^{4+}$ phases. The formation of the blue color, which is considered to be an indicator for the viscosity of the aluminum oxide particles, depends strongly on the portion of titanium oxide ($Ti_2O_3$), which is dissolved in solid form.

The second large group of the fused corundums are the so-called white corundums, which are produced in the electric arc furnace based on calcined alumina. In addition to the pure white corundum, white corundums doped with chromium oxide and which are pink or dark red, respectively, are also known.

The above-described state of the art is reflected in numerous publications, only two selected examples of which shall be cited below.

For example, U.S. Pat. No. 4,157,898 describes a melted aluminum oxide abrasive grain based on alumina comprising a content of between 0.42% by weight and 0.84% by weight of reduced titanium oxide. DE 34 08 952 C2 describes a method for producing corundum by means of reducing melting of bauxite in the electric arc, wherein bauxite is melted reductively by adding metallic aluminum.

Even if the production of melted corundum in the electric arc furnace has already been known for more than 100 years, efforts are still made today, to further improve methods and products, wherein recently the reduction of the production costs, which are characterized significantly by the raw material costs and energy costs, is often the main focus in recent years.

In light of increasing bauxite prices, an attempt was thus made to replace bauxite with calcined alumina as raw material for the production of semi-friable corundum, which, to date, had been considered as not being very sensible from an economic point of view due to the considerable price differences between bauxite and alumina, because the skilled person in the art was furthermore also not able to expect that significant quality differences would occur in response to a substantially unchanging chemical composition, when replacing the raw materials.

Surprisingly, it now turned out that, by replacing bauxite with calcined alumina, it is possible to produce melted titanium oxide-containing aluminum oxide particles, which encompass characteristics, by which they differ from a conventional semi-friable corundum based on bauxite, and which are associated with significant technical advantages for certain applications.

The instant invention will be explained below by means of exemplary embodiments.

EXAMPLE 1

Production of Semi-Friable Corundum

The production of the semi-friable corundums, which are used below for the comparative studies, took place according to a standard recipe according to the state of the art, which was intentionally adapted to the subsequent demands on a production, so that returns and waste from pre-productions were also used. For the product FR (al), which is based on alumina, pure alumina comprising Fe, Ti and Si-containing additions was used instead of the bauxite, which is customary in the standard, so as to adjust the chemical composition of a semi-friable corundum.

The semi-friable corundums with the name FR (bx) and FR (al), which were obtained in the melting process based on this recipe, had the chemical composition listed in Table 1:

TABLE 1

|  | FR (bx) | | FR (al) | |  |
| --- | --- | --- | --- | --- | --- |
|  | 1100° C. | 1300° C. |  | 1100° C. | 1300° C. |
| $Fe_2O_3$ | 0.61 | 0.18 | 0.20 | 0.12 | 0.09 | 0.10 |
| $SiO_2$ | 0.85 | 0.63 | 0.54 | 0.34 | 0.35 | 0.29 |

TABLE 1-continued

|  | FR (bx) | | | FR (al) | | |
| --- | --- | --- | --- | --- | --- | --- |
|  |  | 1100° C. | 1300° C. |  | 1100° C. | 1300° C. |
| $TiO_2$ | 1.77 | 1.68 | 1.63 | 1.60 | 1.49 | 1.51 |
| $ZrO_2$ | 0.14 | 0.15 | 0.14 | 0.05 | 0.04 | 0.04 |
| $Na_2O$ | 0.04 | 0.03 | 0.03 | 0.11 | 0.11 | 0.08 |
| $Al_2O_3$ | 96.45 | 97.19 | 97.34 | 97.69 | 97.82 | 97.88 |
| Remainder | 0.14 | 0.14 | 0.12 | 0.09 | 0.10 | 0.10 |
| Sum | 100.00 | 100.00 | 100.00 | 100.00 | 100.00 | 100.00 |

Depending on the application purpose, the semi-friable corundums, which are processed for granulation, are subjected to an additional thermal post-treatment at 1100° C. or 1300° C.

The corresponding post-treated products were also analyzed chemically and are listed in the table above. It can be seen in the table above that significant differences occur between the two different semi-friable corundum types FR (al) and FR (bx), in particular in the case of the $SiO_2$, $Fe_2O_3$, $ZrO_2$ and $Na_2O$ content.

The titanium oxide-containing aluminum oxide particles based on alumina, which are obtained in this manner, are characterized in that the ratio of the sum of the percentages by weight of $Fe_2O_3$, $SiO_2$ and $ZrO_2$ to the percentage by weight of $Na_2O$ is <10.

Figure 1:
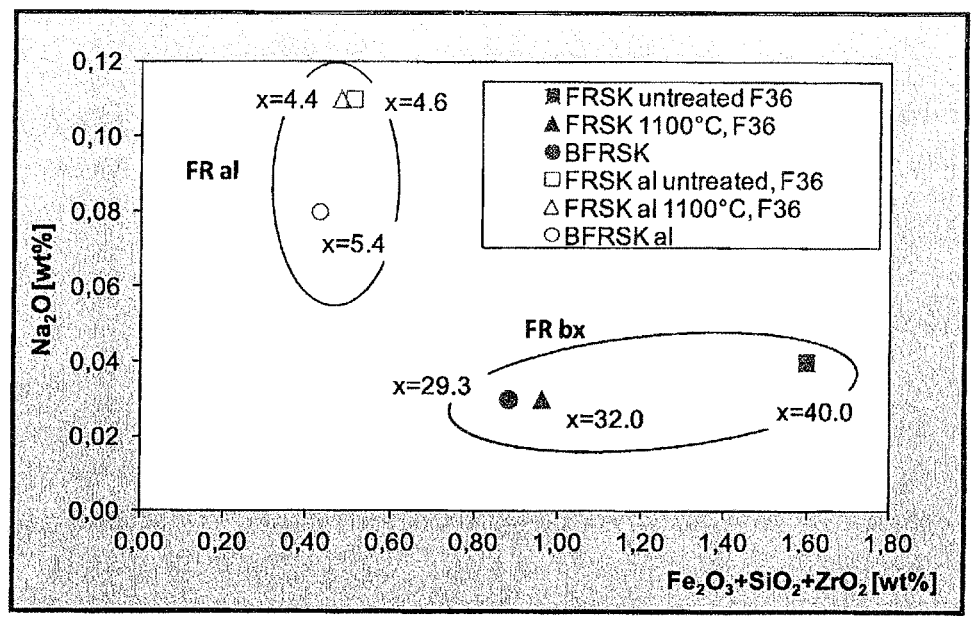
FIG. 1 is a graph of $NaO_2$ content by weight percent vs. $Fe_2O_3+SiO_2+ZrO_2$ content by weight percent.

These contexts or characteristic differences, respectively, in the chemical analysis are illustrated graphically in the diagram, which is enclosed as FIG. 1, wherein it can be seen that significant differences exist between the aluminum oxide particles FR (al) according to the invention, which are obtained from alumina and the conventional aluminum oxide particles based on bauxite FR (bx) in the case of the ratio "x" of the sum of the percentages by weight of $Fe_2O_3$, $SiO_2$ and $ZrO_2$ to the percentage by weight of $Na_2O$, wherein the obtained numerical values differ almost by the factor 10. The typical ranges are identified by means of a border for the respective aluminum oxide particles.

The melting tests had the primary goal of replacing the raw materials for the production of a standard, which had been introduced on the market. The aim was thus a chemical composition, which corresponds to the original product specification. Due to the changed raw materials, however, slight changes resulted in the case of the contaminations or the concomitant substances, respectively.

The qualitative analyses of the aluminum oxide particles, which were obtained in this manner, initially showed that the "burning with a blue flame" of the semi-friable corundum based on alumina is facilitated, which is possibly a result of the raw material-related reduced portion of zirconium oxide in the end product. Typically, zirconium oxide portions of approx. 0.15% by weight can be found in the conventional semi-friable corundum, which is a result of $ZrO_2$ contaminations in the bauxite. By changing the raw material and the use of calcined alumina, it is made possible to keep the portion of zirconium oxide in the end product below 0.1% by weight, preferably below 0.05% by weight, which is associated with the above-described advantages when the semi-friable corundum burns with a blue flame.

Comparative grinding tests, which were carried out in context with analyzing the semi-friable corundum based on alumina, then showed that extraordinarily high increases in performance can be identified for certain applications, which are difficult to explain with the slightly changed chemical composition.

EXAMPLE 2

Grinding Test/Flap Wheels

Semi-friable corundum abrasive grit with the grain size P40 in flap wheels were used, wherein a standard material based on bauxite with the name BFRPL (bx) was compared to a semi-friable corundum based on aluminum BFRPL (al), which is identified as example 1. An iron plate comprising the dimensions 600 mm×5 mm×60 mm was processed, wherein 60 mm×5 mm was removed on the surface. The results of the grinding test are combined in Table 2 below.

TABLE 2

| Semi-friable corundum | BFRPL (bx) | BFRPL (al) |
| --- | --- | --- |
| Removal (g) | 490 g | 714 g |
| Life (min) | 14.3 | 23.0 |
| Cutting speed (U/min) | 34.2 | 31.0 |

A significant increase in performance (increased material removal) can be seen in the case of the semi-friable corundum based on alumina due to the longer life, under which the cutting speed suffers only slightly.

EXAMPLE 3

Grinding Test/Cut-Off Wheels

Synthetic resin-bonded cut-off wheels comprising a diameter of 180 mm, by means of which construction steel ST37 comprising the dimensions 30.4 mm×8.2 mm was separated, were made of semi-friable corundum in the grain size P36. For this purpose, 12 cuts were in each case carried out at a rotation of 8000 rpm in response to an infeed of 0.9 $cm^2$/sec after 3 precuts. The results are combined in Table 3 below.

TABLE 3

| Semi-friable corundum | BFRPL (bx) | BFRPL (al) |
| --- | --- | --- |
| G-factor ($cm^2/cm^2$) | 17.5 | 20.6 |

EXAMPLE 4

Image Analysis ImageJ (Version 1.44)

Due to the fact that the differences in performance with the slightly different chemical composition, which were found in response to the above-listed grinding tests, were difficult to explain, further comparative analyses were carried out between semi-friable corundum particles based on bauxite and those based on alumina, which focused on studying the grain shape. For this purpose, granulations of the grain size F36, which were processed during the production operation and which were processed on exactly the same crushing systems under the same conditions, of a standard material based on bauxite and of a semi-friable corundum based on aluminum oxide were compared with one another. Illustrations of fills of the grain sizes F36 were created with the help of a light microscope and were subsequently analyzed by means of the image analyzing software ImageJ (version 1.44p).

Image Analysis ImageJ (Version 1.44p)
The parameters of the image analyzing software are defined as follows:

Roundness $C$ = roundness, $A$ = surface area, $\quad C = 4\pi \dfrac{A}{P^2}$ $P$ = circumference Aspect Ratio $AR$ = aspect ratio, $d_{max}$ = maximum diameter, $\quad AR = \dfrac{d_{max}}{d_{min}}$ $d_{min}$ = minimum diameter Compactness (Solidity)

$S$ = solidity, $A$ = actual particle surface, $\quad S = \dfrac{A}{A+B}$ $B$ = convex particle surface

TABLE 4

| | Semi-friable corundum FR (bx) (bauxite) mean value | Semi-friable corundum FR (al) (alumina) mean value |
|---|---|---|
| Roundness | 0.512 | 0.488 |
| Aspect ratio | 1.410 | 1.564 |
| Compactness | 0.836 | 0.782 |

While only slight differences can be seen between the two semi-friable corundum types with regard to the roundness and the aspect ratio, the difference in the compactness can be considered to be significant. The semi-friable corundum based on alumina encompasses a considerably lower arithmetic mean compactness, which suggests a splintery, sharp-edged shape, which can possibly be seen as the cause for the improved grinding power.

Figure 2:
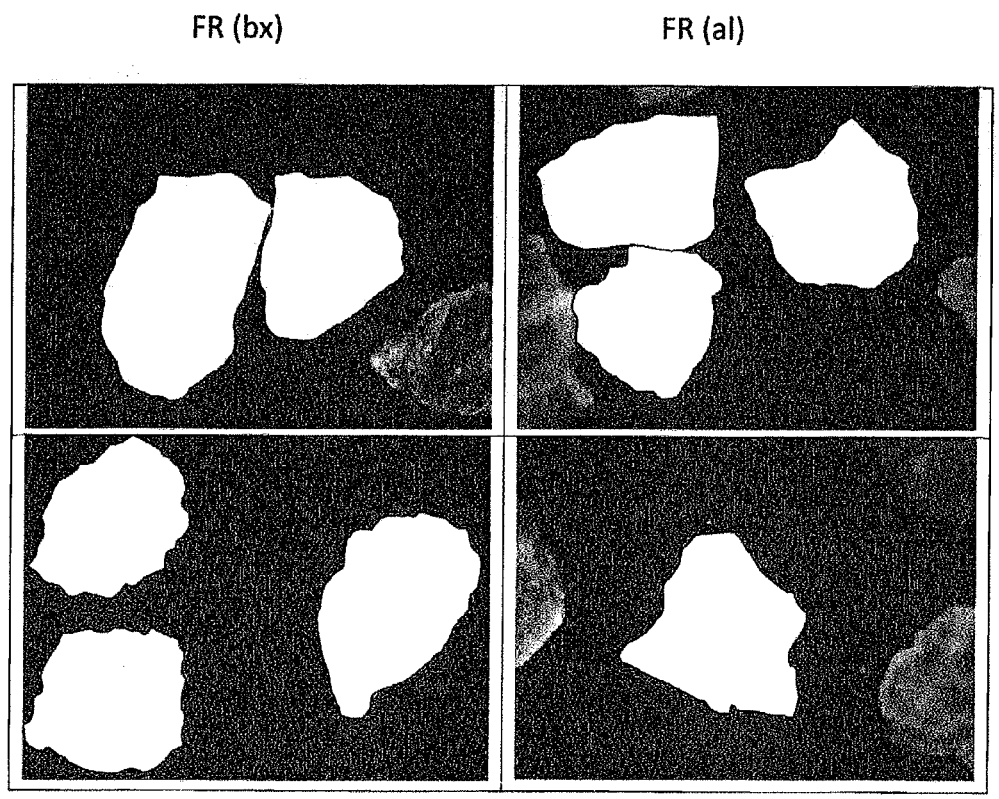
FIG. 2 shows sections of enlarged light microscopic pictures of grain size F36 of titanium oxide-containing aluminum oxide particles according to exemplary embodiments based on alumina, and of conventional titanium oxide-containing aluminum oxide particles based on bauxite.

FIG. 2 shows sections of enlarged light microscopic pictures of a grain size F36 of titanium oxide-containing aluminum oxide particles according to the invention based on alumina and of conventional titanium oxide-containing aluminum oxide particles based on bauxite, in each case next to one another, wherein the outlines of typical grains were traced and were highlighted in white, so as to elucidate the differences. It can be seen thereby that the titanium oxide-containing aluminum oxide particles based on alumina FR (al) encompass more sharp edges and are more angular than the titanium oxide-containing aluminum oxide particles based on bauxite FR (bx).

The subject matter of the instant invention are thus titanium oxide-containing aluminum oxide particles based on corundum melted in an electric arc furnace from calcined alumina comprising the chemical composition: $Al_2O_3$>97.0% by weight, $Fe_2O_3$<0.2% by weight, e.g. $Fe_2O_3$ between 0.05 and 0.2% by weight, $SiO_2$<0.5% by weight, e.g. $SiO_2$ between 0.1 and 0.5% by weight, $TiO_2$ between 1.3 and 1.8% by weight, $ZrO_2$<0.1% by weight, e.g. $ZrO_2$ between 0.02 and 0.1% by weight, $Na_2O$ between 0.05 and 2.0% by weight and others (CaO, MgO, $K_2O$)<0.2% by weight, in each case based on the total weight of the melted corundum.

The titanium oxide-containing aluminum oxide particles encompass an arithmetic mean compactness of <0.8, wherein the measure for the compactness is the solidity (S), which is determined with the help of a picture analysis and which is defined as the ratio of the actual particle surface (A) to the convex particle surface (B).

The titanium oxide-containing aluminum oxide particles according to the invention are furthermore characterized in that the ratio of the sum of the percentages by weight of $Fe_2O_3$, $SiO_2$ and $ZrO_2$ to the percentage by weight of $Na_2O$ is <10.

An advantageous embodiment of the instant invention provides for the titanium-containing aluminum oxide particles to encompass a portion of $ZrO_2$<0.05% by weight.

A method for producing titanium oxide-containing aluminum oxide particles based on corundum melted in an electric arc furnace from calcined alumina is also the subject matter of the instant invention. The method comprises the steps of melting a mixture of $Al_2O_3$, $TiO_2$, $SiO_2$ and $FeO_3$-containing raw materials in the presence of iron filings and charcoal in the electric light arc furnace, the cool-down of the melted mixture to obtain a solid block, which consists substantially of corundum, and the comminution and processing of the corundum block, which is to be obtained, into defined particle size distributions. Raw materials, which contain small quantities of contaminations, are thereby used as raw materials, chosen from the group consisting of calcined alumina, rutile, ilmenite and iron ore in such quantities that titanium oxide-containing aluminum oxide particles comprising the chemical composition $Al_2O_3$>97.0% by weight, $Fe_2O_3$<0.2% by weight, e.g. $Fe_2O_3$ between 0.05 and 0.2% by weight, $SiO_2$<0.5% by weight, e.g. $SiO_2$ between 0.1 and 0.5% by weight, $TiO_2$ between 1.3 and 1.8% by weight, $ZrO_2$<0.1% by weight, e.g. $ZrO_2$ between 0.02 and 0.1% by weight, $Na_2O$ between 0.05 and 2.0% by weight and others (CaO, MgO, $K_2O$)<0.2% by weight are obtained.

The titanium oxide-containing aluminum oxide particles encompass an arithmetic mean compactness of <0.8, wherein the measure for the compactness, is the solidity (S), which is determined with the help of a picture analysis and which is defined as the ratio of the actual particle surface (A) to the convex particle surface (B).

The titanium oxide-containing aluminum oxide particles, which are obtained in this manner, are used for the production of abrasives and/or fireproof materials.

The invention claimed is:

1. Titanium oxide-containing aluminium oxide particles based on corundum melted in an electric arc furnace from calcined alumina, the aluminium oxide particles comprising:
   $Al_2O_3$ greater than 97.0% by weight,
   $Fe_2O_3$ 0.05% by weight to 0.2% by weight,
   $SiO_2$ 0.1% by weight to 0.5% by weight,
   $TiO_2$ 1.3% by weight to 1.8% by weight,
   $ZrO_2$ 0.02% by weight to 0.1% by weight,
   $Na_2O$ 0.05% by weight to 2.0% by weight, and
   other oxides less than 0.2% by weight,
   in each case based on the total weight of the melted corundum, characterized in that the ratio of the sum of the percentages by weight of $Fe_2O_3$, $SiO_2$, and $ZrO_2$ to the percentage by weight of $Na_2O$ is less than 10.

2. The aluminum oxide particles according to claim 1, characterized in that the aluminum oxide particles encompass an arithmetic mean compactness of less than 0.8, wherein compactness is solidity (S), which is determined via image analyzing software and which is defined as a ratio of actual particle surface (A) to convex particle surface (B).

3. A method for producing at least one of abrasives and fireproof materials, the method comprising:
   providing the aluminum oxide particles of claim 1; and
   forming at least one of the abrasives and the fireproof materials comprising the aluminum oxide containing particles.

4. A method for producing at least one of abrasives and fireproof materials, the method comprising:
   providing the aluminum oxide particles of claim 2; and
   forming at least one of the abrasives and the fireproof materials comprising the aluminum oxide containing particles.

5. A method for producing titanium oxide-containing aluminum oxide particles based on corundum melted in an electric arc furnace from alumina, comprising:
   melting a mixture of $Al_2O_3$, $TiO_2$, $SiO_2$, and $Fe_2O_3$ containing raw materials in the presence of iron filings and charcoal in the electric light arc furnace,
   cooling the melted mixture to obtain a solid block, which consists substantially of corundum, and
   comminuting and processing of the corundum block into defined particle size distributions, wherein raw materials, which contain small quantities of contaminations, are thereby used as raw materials, wherein the raw materials are selected from the group consisting of calcined alumina, rutile, ilmenite, and iron ore in such quantities that titanium oxide-containing aluminum oxide particles comprise the chemical composition
   $Al_2O_3$ less than 97.0% by weight,
   $Fe_2O_3$ 0.05% by weight to 0.2% by weight,
   $SiO_2$ 0.1% by weight to 0.5% by weight,
   $TiO_2$ 1.3% by weight to 1.8% by weight,
   $ZrO_2$ 0.02% by weight to 0.1% by weight,
   $Na_2O$ 0.05% by weight 2.0% by weight, and
   other oxides less than 0.2% by weight,
   and an arithmetic mean compactness of less than 0.8 are formed, wherein compactness is solidity (S), which is determined via image analyzing software and which is defined as a ratio of actual particle surface (A) to convex particle surface (B).

* * * * *

UNITED STATES PATENT AND TRADEMARK OFFICE
CERTIFICATE OF CORRECTION

PATENT NO. : 9,163,128 B2
APPLICATION NO. : 14/360170
DATED : October 20, 2015
INVENTOR(S) : Sebastian Sachse, Andreas Börger and Alexander Kral It is certified that error appears in the above-identified patent and that said Letters Patent is hereby corrected as shown below:

Title page, item 72, line 2, "Boerger" should read -- Börger --.

Signed and Sealed this
Twenty-eighth Day of June, 2016

Michelle K. Lee
*Director of the United States Patent and Trademark Office*